2,686,667

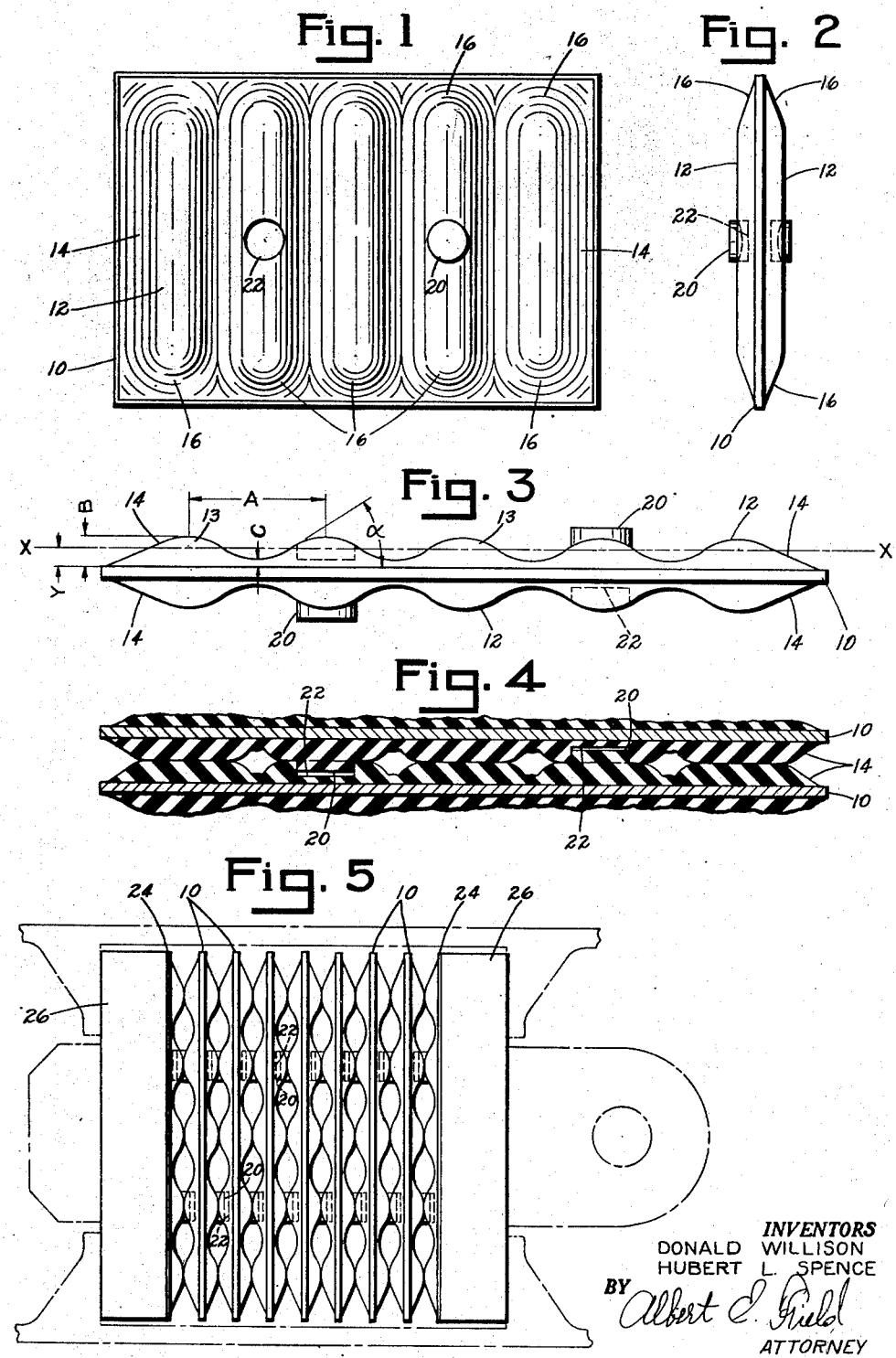
Aug. 17, 1954 — D. WILLISON ET AL — 2,686,667
CUSHIONING DEVICE
Filed Jan. 14, 1950 — 3 Sheets-Sheet 1
INVENTORS
DONALD WILLISON
HUBERT L. SPENCE
BY Albert E. Field
ATTORNEY INVENTORS
DONALD WILLISON
HUBERT L. SPENCE
BY Albert S. Field
ATTORNEY

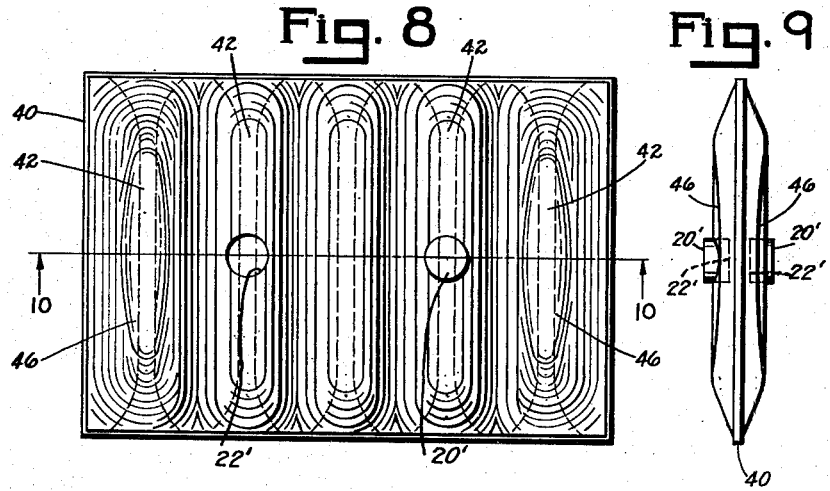
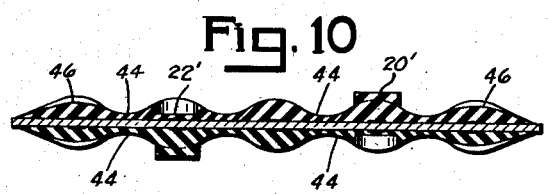
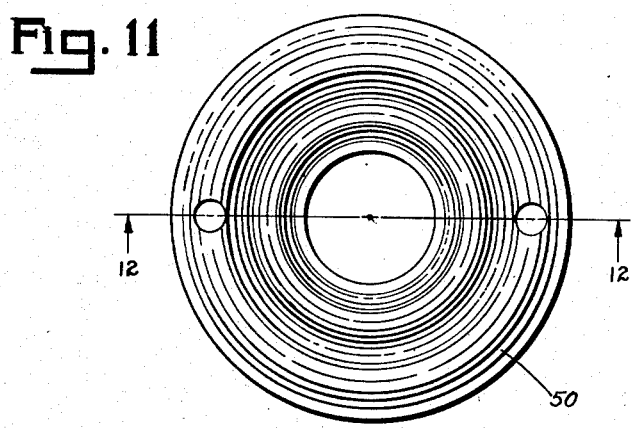
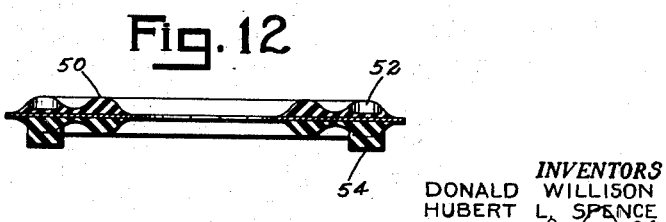
INVENTORS
DONALD WILLISON
HUBERT L. SPENCE Patented Aug. 17, 1954

UNITED STATES PATENT OFFICE 2,686,667

CUSHIONING DEVICE

Donald Willison, Warrensville Heights, and Hubert L. Spence, East Cleveland, Ohio, assignors to National Malleable and Steel Castings Company, Cleveland, Ohio, a corporation of Ohio Application January 14, 1950, Serial No. 138,614

15 Claims. (Cl. 267—1)

Our invention relates to a rubber and metal compression pad for use in shock cushioning mechanism such as railway car draft gears and buffers.

It is well known that for use on American freight cars a draft gear must have a cushioning capacity greater than 18,000 foot pounds in order to be acceptable for interchange freight service under the A. A. R. Draft Gear Specification M–901. This specification also sets up dimensional limitations for draft gears, as obviously all draft gears for interchange service must conform to standard freight car construction so far as the draft gear pocket, yoke and coupled dimensions are concerned. A draft gear for modern railroad service, regardless of whether it makes use of metallic springs and friction or of rubber as the cushioning and shock-absorbing medium, must be able to sustain high fluctuating loads for considerable periods of time without creeping or slipping and must be able to withstand shock loads of even greater magnitude. The starting tractive effort of modern diesel freight locomotives is as high as 250,000 pounds, and the tractive effort which they can exert continuously is 170,000 pounds, or higher.

The art of rubber compounding and curing, and the art of bonding rubber to metal has developed during the past several years to the point where rubber pads of proper surface configuration and of dimensions suitable for service under the above outlined conditions can be produced.

We have devised a rubber pad of dimensions suitable for use in American standard car construction and having a surface configuration which, as the result of an extended testing program, has been found to have outstanding cushioning qualities and durability.

The various features and advantages of our invention will be apparent from the following description taken in conjunction with the drawings in which:

Fig. 1 is a plan view of a pad embodying the invention.

Fig. 2 is an end elevation of the pad shown in Fig. 1.

Fig. 3 is an enlarged side elevation of the pad shown in Fig. 1.

Fig. 4 is a section through the center of a pair of pads partially compressed.

Fig. 5 is a plan view of a typical assembly of several of these pads to produce a draft gear embodying our invention.

Fig. 8 shows a modified form of the pad shown in Figs. 1, 2 and 3 in which the rubber is cured to the metal plate only in certain areas.

Fig. 9 is an end elevation of the pad shown in Fig. 8.

Fig. 10 is a sectional view taken along line 10—10 of Fig. 8.

Fig. 11 is a plan view of a pad of circular form.

Fig. 12 is a sectional view taken along line 12—12 of Fig. 11.

Figure 6:
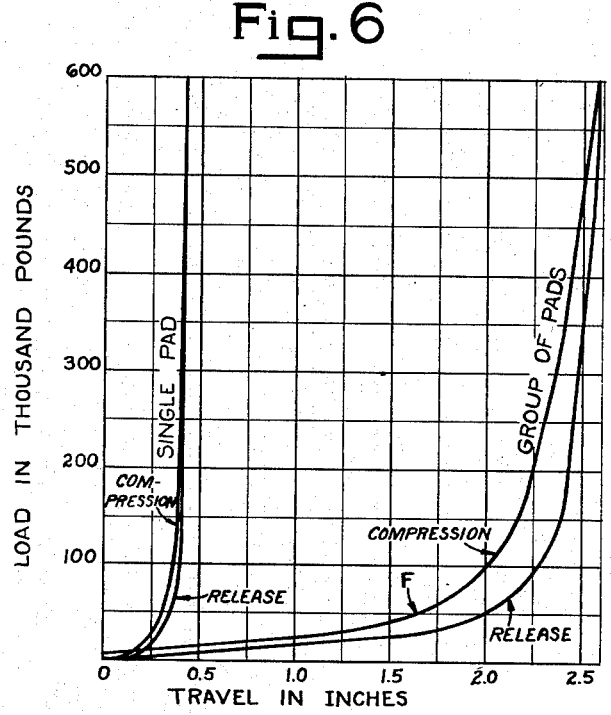
Fig. 6 shows the compression and release curves produced by a single pad and by an assembly of pads when closed and released slowly, as in a static test machine.

As will be seen from Fig. 1, the pad in its preferred form consists of a relatively thin metal plate 10 on each side of which is bonded a rubber cushion 12. The surface of the rubber cushion, in its free or unstressed condition is of a corrugated or "hill and valley" shape.

We have found that the shape of this surface is of considerable importance and believe that in order to obtain the maximum amount of useful work per cubic inch of rubber, consistent with a long service life, a certain approximate dimensional relation between the distance between ridges 13 of the corrugations, the depth of the corrugations, and the minimum thickness of the rubber in the "valleys" should be maintained.

In Fig. 3 we have indicated the distance between ridges 13 of the corrugations by the letter A, the thickness of the rubber at the crest of the ridge or "hill" as B and the thickness in the "valleys" as C. In the particular form shown in Figs. 1, 2 and 3 the A dimension is equal to approximately 4.8 times the B dimension, whereas in a slightly different form which has withstood very severe endurance testing, the A dimension is equal to 4.1 times the B dimension which remained the same, and the C dimension, which was the same in both forms, is 25 per cent of the B dimension. The radius of curvature of the crest of each "hill" is preferably the same as that for the "valley." These dimensions taken together with the radii of curvature of the "hills" and "valleys" determine the maximum slope of the rubber surface which is indicated by the letter alpha, and which in the two cases referred to is approximately 34 degrees and 41½ degrees, respectively. We believe that any slope within a range of about 32 to 42 degrees will be satisfactory.

The outer side portions 14 of the end ridges of the corrugations are formed so as to slope gradually from the surface of the plate to the crest of the ridges. Likewise the ends of each of the ridges of the corrugations are sloped gradually to the surface of the plate as at 16. We have found that this gradual sloping of the rubber from the plate to the crests of the corrugations is necessary in order to protect the bond between the rubber and the metal plate along the peripheral edges of the rubber when the rubber is subjected to heavy compressive forces. Preferably the slope of surfaces 14 and 16 should be less than alpha and in any event no greater than alpha.

The "solid" thickness of the rubber is determined by the datum plane $x-x$ (Fig. 3) drawn at such a distance Y above the surface of the metal plate 10 that the volume of the rubber above the plane is equal to the volume of the "valley" or space below the plane. When a pad is compressed to this "solid" thickness Y, the rubber has been so worked that the space below the plane $x-x$ has become completely filled with rubber, and the pad has become, in effect, a solid block of rubber of thickness Y. Any further compression of this pad causes increased outward bulging of the rubber around the periphery of the pad. The resistance then offered by the pad is very great, but it still has an important cushioning value even at this high degree of compression.

As shown in Fig. 5 these pads are preferably assembled each with its corrugated surface directly in contact with the corrugated face of the adjacent pads and held accurately in alignment with the adjacent pads by the projection-and-recess engagement of dowel 20 and recess 22 formed on both sides of each pad fitting in complementary recesses and dowels of the adjacent pads. In the preferred form of the pad, as shown in Figs. 1 to 5, the dowel and recess are so arranged on each side of the pad that the dowel on one side is disposed directly opposite the recess on the other side. The dowels are a snug fit in the recesses, so that as the rubber deflects the dowels deflect in unison with it, thus avoiding any abrasion. In Fig. 5 we have shown the use of end pads in which there is rubber on only one side of the metal plate 24. In this case the metal plate bears directly against the draft gear follower 26, thus avoiding any rubber to metal contact.

When a group of pads arranged as shown in Fig. 5 are compressed against one another, the area of contact between the engaging crests of the corrugations is relatively small and the pads compress relatively easily as shown in Fig. 6 by the compression curve at the right, from zero travel up to about the point F. During this part of the compression some of the rubber tends to flow from the "hills" into the thin areas indicated by the dimension C, thereby increasing slightly the thickness of the rubber in those areas. The approximate configuration of the rubber at one point during this stage of the compression is shown in Fig. 4. It will be observed that the "valleys" have been partly filled in by the rubber. When the point F on the curve is reached at approximately one-half of the working travel of the group of pads, the contact area between the corrugations is increasing rapidly, with the rubber surfaces rolling against each other. From point F the contact area increases more rapidly and as the "valleys" become nearly completely filled the side of a corrugation engages the side of the next corrugation so that each of the contacting sides provides lateral support to the other. This lateral supporting of the "hills" of the corrugations which occurs during the latter part of the filling of the "valleys" serves to increase considerably the resistance to further compression of the pads and constitutes a feature of the invention. As compression of the pads continues the "valleys" become completely filled so that the sides of the "hills" are fully supported. Thereupon, the pad in effect becomes a solid block of rubber and further compression thereof is resisted by outward bulging or deflection of the rubber around the periphery of the pad. The gradual sloping of the peripheral edge surfaces of the rubber from the surface of the plate to the crests of the corrugations as at 14 and 16 serves to protect the bond between the pad and the plate upon further compression of the pad from this point. The pad now offers a very high resistance to compression, which is needed for cushioning heavy shocks or collision loads. It is thus seen that the pads provide comparatively soft action during approximately the first half of their working travel. Thereafter, however, the cushioning action of the pads stiffens rapidly but smoothly to the end of their working travel as seen by that part of the curve above point F.

The cushioning pads of the type herein disclosed have been compressed an amount equal to approximately 40 to 45 per cent of the thickness of the rubber at the crests of the corrugations and we have found that these pads have sufficient ruggedness and durability to withstand repeated shock loads of upwards of a million pounds. We have also found that a certain minimum thickness or strength of the metal plates or inserts is required. For instance, with mild steel inserts, $\frac{3}{32}$ inch thick, a load of 700,000 pounds caused considerable stretch of the inserts. For the type of draft gear assembly shown in Fig. 5, we prefer to use inserts 10 of about $\frac{3}{16}$ inch thickness or twice the strength of the above mentioned mild steel inserts for all of the pads except the end pads. The inserts 24 for the end pads may be $\frac{3}{32}$ inch thick since only one half the stretching force is applied to these inserts.

Figure 7:
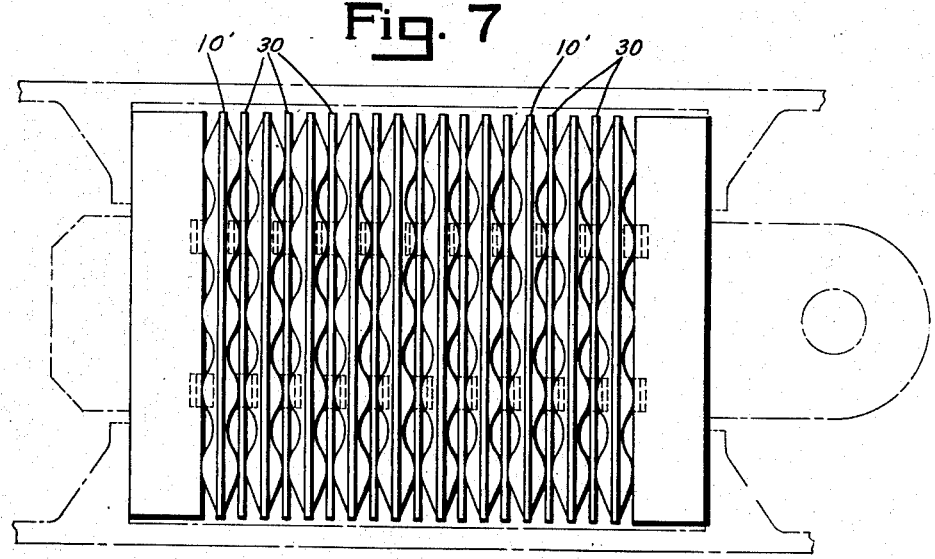
Fig. 7 illustrates an assembly of our pads having spacer plates therebetween, together with followers.

In Fig. 7 we have shown an assembly in which the rubber pads are separated by spacer plates 30. These spacer plates assist in resisting the bursting or stretching forces of the rubber resulting from high shock loads. For this type of assembly the insert plates 10' may, if desired, be somewhat thinner than in the assembly shown in Fig. 5.

In Figs. 8, 9 and 10 we have shown a modification in which the rubber is bonded to the plate 40 only at certain areas. These areas are between the pairs of dashed lines shown in Fig. 8 as at 42 and are located generally beneath the thickest zones of the rubber. With this pad the unbonded lateral extremities of the rubber are free to move on the plate, and are restrained only by the friction and the natural elasticity of the rubber. This type of adhesion allows the rubber to flow laterally more readily than is possible where it is completely bonded to the plate. For a given load this modified form of rubber pad produces a greater deflection than is possible with the preferred form.

The surface configuration of the rubber pad shown in Figs. 8, 9 and 10 is similar to that shown in the preceding figures. If it is desired to take full advantage of this partial or localized adhesion, the thickness of the rubber in the "valleys" 44 may be reduced or it may be entirely eliminated, thus allowing the remaining rubber to flow more readily when compressed. In Fig. 8 we have also shown the surface of the end corrugation depressed or scalloped as at 46 in areas on either side of the longitudinal center line of the pad. This softens the initial compressive action of the pad and reduces the lateral bulging of the rubber adjacent the ends of the pad when the pad is severely compressed and thereby reduces the stress in the bond between rubber and metal plate. This construction may also be used in connection with pads of the type shown in Figs. 1–3. As with the previous pad, the pads are held accurately in alignment with the adjacent pads by the projection-and-recess engagement of dowel 20' and recess 22' formed on both sides of each pad fitting in complementary recesses and dowels of the adjacent pads.

From the above description it will be seen that we have developed a cushioning pad suitable for very heavy duty service and having a high degree of durability. For standard A. A. R. freight car construction a series of pads about 12¼ inches wide by 8⅓ inches high can be used with conventional followers in the standard draft gear pocket and with the standard type of yoke.

We have found that a draft gear made up of ten such pads, with spacer plates therebetween, when assembled under a pre-compression of 5000 pounds produces a working travel of between 2½ and 2¾ inches. Fig. 7 shows the assembly of such a draft gear. Its capacity when compressed slowly is greater than 18,000 foot pounds and when compressed rapidly, as under shock conditions, its capacity is very substantially greater. This increase of capacity with increasing speed of closure is inherent in properly designed and compounded rubber and is a very valuable characteristic for draft gear service.

It will be noted that there is no metal-to-metal contact between the draft gear parts to limit its travel. All normal working loads as well as collision loads are carried by the rubber pads.

The length of the assembly of pads shown in Fig. 7 is very much less than the length of the standard draft gear pocket. For use in such a pocket, followers in addition to those shown may be used to bring the assembly up to the proper length.

While the pads described above are rectangular in shape, the same results may be obtained by the use of circular pads, or pads of other shapes if those shapes better fit the space in which they are to be used. Thus in Fig. 11 we have shown a circular pad for use in mine car draft gears or in a side buffer for European type railway cars. In this case the corrugations are concentric. Dowels 54 and corresponding recesses 52 are provided to maintain proper alignment of a group of such pads stacked together as in a draft gear or buffer.

It is obvious that by varying the number of pads or their dimension or the hardness of the rubber, a very wide range of shock cushioning or shock absorbing characteristics can be produced. For instance, in Fig. 6 we have shown at the left-hand side of the graph the compression and release curve produced by a single rubber pad of the type shown in Figs. 1–3, the curve starting at zero load, ending at a load of 600,000 pounds and producing a travel or compression of about 0.4 inch. At this load the rubber has been compressed an amount equal to approximately 40 per cent of its uncompressed height measured at the crests of the corrugations. The curve to the right was produced by a group of such pads stacked together and assembled under 5,000 pounds initial compression. Each curve shows the release action as well as the compressive action of the pad or pads and indicates that under the conditions of slow closure and release the pads absorbed a very substantial percentage of the work done upon them. Each pad of the group of pads has been compressed an amount equal to approximately 40 per cent of its uncompressed height, measured at the crests of the corrugations.

We have described our invention in connection with the railroad draft gears in order to illustrate the heavy-duty, shock cushioning and absorbing ability of the pads as distinguished from the many designs and applications of rubber intended only for vibration damping or insulating purposes.

We have found that when the pads are subjected to repeated shock loading which compresses the rubber an amount equal to about 40 to 45 per cent of its uncompressed height, measured at the crests of the corrugations, no bond failure occurred where the slope of the rubber from the surface of the plate to the crests of the corrugations, as at 14 and 16, Figs. 1–3, was about 24 degrees. However, when this slope was about 30 degrees and the pad was subjected to the above shock loading there was a tendency toward failure of the bond at the peripheral edges of the rubber. While an angle of about 30 degrees was thus not satisfactory for shock loads under the high degree of compression to which the pads were subjected, this angle has been found to be satisfactory where lesser compressive loads, for example those loads producing about 35 per cent compression of the rubber, are applied to the pads.

While throughout this specification the term "rubber" has been used it will be understood that any similar cushioning material may be utilized in its place.

The terms and expressions which we have employed are used in a descriptive and not a limiting sense, and we have no intention of excluding such equivalents of the invention described, or portion thereof, as fall within the purview of the claims.

What we claim is:

1. A cushioning pad for use in a railway shock cushioning mechanism, comprising a plate member and a rubber cushion bonded to a face of said member, said cushion having a corrugated surface so formed that the curvature of the crest portion of a corrugation is equal to the curvature of the valley portion of the corrugation, the thickness of the rubber at the valley portion being about 25 per cent of the thickness of the rubber at the crest of the corrugation, the peripheral edge surfaces on all sides of the cushion being sloped gradually from the surface of the plate to the crests of the corrugations.

2. A cushioning pad for use in a shock cushioning mechanism, comprising a plate member and a rubber cushion bonded to a side of said plate, said cushion comprising a base portion and a series of spaced ridges on said base portion extending across said plate, the peripheral edge surfaces of said cushion being sloped gradually from the surface of said plate to the crests of said ridges.

3. A cushioning pad for use in a shock cushioning mechanism, comprising a plate member and a rubber cushion bonded to each side of said plate, each of said cushions comprising a base portion and a series of spaced ridges on said base portion, the top surface of each of said ridges being convexly rounded and joined to a corresponding but concavely curved surface on said base portion between said ridges, the peripheral edges of said cushions being sloped gradually from the surface of said plate to the tops of said ridges.

4. A cushioning pad for a shock cushioning mechanism, comprising a plate member and a rubber cushion bonded to each side of said plate, said cushion comprising a ridge portion having part of its top surface scalloped in a direction lengthwise of the ridge, said cushion being sloped gradually from the surface of said plate to the top of said ridge portion.

5. A cushioning pad for shock cushioning mechanism, comprising a plate member and a rubber cushion, said cushion having a corrugated configuration forming alternate ridges and valleys extending across said pad, said cushion being bonded to a side of said plate only in areas located generally beneath said ridges.

6. A cushioning pad for shock cushioning mechanism, comprising a plate member interposed between a pair of rubber cushions, each of said cushions comprising a base portion in contact with a side of said plate and spaced ridge portions on said base portion, said cushions being bonded to said plate only in limited areas beneath said ridge portions.

7. A cushioning pad for shock cushioning mechanism, comprising a plate member and a rubber cushion, said cushion comprising spaced ridge portions extending across said pad, said cushion being bonded to said plate only in limited areas beneath said ridge portions.

8. A cushioning pad for use in a shock cushioning mechanism, comprising a plate member and a rubber cushion bonded to a side of said plate, said cushion having a corrugated configuration forming alternate ridges and valleys extending across said pad, said cushion being sloped from the surface of said plate starting at the peripheral edges of said cushion to the crests of the ridges at an angle no greater than about 30 degrees.

9. A cushioning pad for use in a shock cushioning mechanism, comprising a plate member and a rubber cushion bonded to a side of said plate, said cushion having a corrugated configuration forming alternate ridges and valleys extending across said pad, said cushion being sloped from the surface of said plate along the peripheral edges of said cushion to the crests of the ridges at an angle no greater than about 24 degrees to permit repeated compression of said pad an amount equal to 40 to 45 per cent of the thickness of the rubber at the crests of the ridges without bond failure.

10. A cushioning pad for use in a shock cushioning mechanism, comprising a plate member and a rubber cushion bonded to each side of said plate, said cushion having a corrugated configuration forming alternate ridges and valleys, said pad on one side thereof having integral dowels extending from said ridges and having on the other side thereof corresponding recesses in said ridges for receiving the dowels of a similar pad to maintain the pads in alignment.

11. A cushioning pad for shock cushioning mechanism, comprising a plate member and a pair of similar rubber cushions bonded to opposite sides of said plate, each of said cushions having a base portion and a series of spaced ridges on said base portion extending across said plate, each of said cushions having an integral dowel extending from one of said ridges and a corresponding recess in another of said ridges, said dowel and recess being adapted to interlock with the recess and dowel of a similar pad to ensure accurate alignment of the pads, said dowel and recess being so arranged on said cushions that the dowel on one cushion is disposed directly opposite the recess on the other cushion.

12. A cushioning pad for shock cushioning mechanism, comprising a plate member and a pair of similar rubber cushions bonded to opposite sides of said plate, the face of each of said cushions having a corrugated configuration, each of said cushions having a dowel extending above said face and a corresponding recess in said face spaced from said dowel, said dowel and recess being adapted to interlock with the recess and dowel of a similar pad to ensure accurate alignment of the pads, said dowel and recess being so arranged on said cushions that the dowel on one cushion is disposed directly opposite the recess on the other cushion.

13. A cushioning pad for use in a shock cushioning mechanism, comprising a plate member and a rubber cushion secured thereto, the face of said cushion having a corrugated configuration, said cushion having an integral rubber projection extending above said face and a corresponding recess in said face spaced from said projection said projection and recess being of substantially the same dimensions, said cushioning pad being adapted for assembly with a similar pad, the projection and recess of said pad interlocking with the recess and projection of said similar pad to ensure accurate alignment of the pads upon initial assembly thereof.

14. A cushioning pad for use in a shock cushioning mechanism, comprising a plate member and rubber cushions secured thereto, the face of said rubber cushions comprising spaced ridges, an integral projection extending from the face of one of said ridges and a corresponding recess spaced from said projection in one of said ridges, said cushioning pad being adapted for assembly with a similar pad, said projection and recess being of substantially the same dimension, the projection of said pad interlocking with the recess of said similar pad to ensure accurate alignment of the pads during initial assembly thereof.

15. A cushioning pad for use in a shock cushioning mechanism comprising a plate member and a rubber cushion bonded to a side of said plate, said cushion comprising a series of spaced parallel ridges, the adjacent sides of said ridges sloping downwardly toward each other and the peripheral edge surfaces of said ridges sloping downwardly toward said plate with a slope of lesser steepness than the slope between said ridges, the slope of said peripheral edge surfaces being no greater than about 30 degress.

References Cited in the file of this patent

UNITED STATES PATENTS

| Number | Name | Date |
|---|---|---|
| 2,165,383 | Johnson et al. | July 11, 1939 |
| 2,187,156 | Johnson | Jan. 16, 1940 |
| 2,486,741 | Gabriel | Nov. 1, 1949 |
| 2,553,635 | Dath | May 22, 1951 |

FOREIGN PATENTS

| Number | Country | Date |
|---|---|---|
| 10,615 of 1889 | Great Britain | July 1, 1889 |
| 265,419 | Great Britain | Feb. 10, 1927 |
| 375,954 | Great Britain | July 7, 1932 |
| 464,621 | Great Britain | Apr. 21, 1937 |